US006003002A

United States Patent [19]

Netsch

[11] Patent Number: 6,003,002

[45] Date of Patent: Dec. 14, 1999

[54] METHOD AND SYSTEM OF ADAPTING SPEECH RECOGNITION MODELS TO SPEAKER ENVIRONMENT

[75] Inventor: Lorin P. Netsch, Allen, Tex.

[73] Assignee: Texas Instruments Incorporated, Dallas, Tex.

[21] Appl. No.: 08/999,442

[22] Filed: Dec. 29, 1997

Related U.S. Application Data

[60] Provisional application No. 60/034,473, Jan. 2, 1997.

[51] Int. Cl.[6] .......... G10L 5/06

[52] U.S. Cl. .......... 704/236; 704/246; 704/251

[58] Field of Search .......... 704/246–250, 704/251–258, 236

[56] References Cited

U.S. PATENT DOCUMENTS

| | | | |
|---|---|---|---|
| 5,222,187 | 6/1993 | Doddington et al. | 704/200 |
| 5,271,088 | 12/1993 | Bahler | 704/200 |
| 5,293,452 | 3/1994 | Picone et al. | 704/250 |
| 5,297,194 | 3/1994 | Hunt et al. | 379/88.02 |
| 5,321,773 | 6/1994 | Kopec et al. | 382/209 |
| 5,517,558 | 5/1996 | Schalk | 379/88.02 |
| 5,675,706 | 10/1997 | Lee et al. | 704/256 |
| 5,687,287 | 11/1997 | Gandhi et al. | 704/247 |
| 5,719,921 | 2/1998 | Vysotsky et al. | 379/88.01 |
| 5,790,754 | 8/1998 | Mozer et al. | 704/232 |
| 5,832,063 | 11/1998 | Vysotsky et al. | 379/189 |
| 5,839,103 | 11/1998 | Mammone et al. | 704/232 |

OTHER PUBLICATIONS

Richard J. Mammone, Xiaoyu Zhang, Ravi P. Ramachandran, "Robust Speaker Recognition," IEEE Signal Processing Magazine, Sep. 1996.

*Primary Examiner*—David R. Hudspeth
*Assistant Examiner*—Michael N. Opsasnick
*Attorney, Agent, or Firm*—Robert L. Troike; Richard L. Donaldson

[57] ABSTRACT

The method and system of adapting speech recognition models to a speaker environment may comprise receiving a spoken password (52) and getting a set of speaker independent (SI) speech recognition models (54). A mapping sequence may be determined for the spoken password (56). Using the mapping sequence, a speaker ID may be identified (58). A transform may be determined (66) between the SI speech recognition models and the spoken password using the mapping sequence. Speaker adapted (SA) speech recognition models may be generated (68) by applying the transform to SI speech recognition models. A speech input may be recognized (70) by applying the SA speech recognition models.

23 Claims, 2 Drawing Sheets

METHOD AND SYSTEM OF ADAPTING SPEECH RECOGNITION MODELS TO SPEAKER ENVIRONMENT

This application claims priority under 35 USC § 119 (e) (1) of provisional application No. 60/034,473, filed Jan. 02, 1997.

TECHNICAL FIELD OF THE INVENTION

This invention relates generally to the field of voice processing, and more particularly to a method and system of adapting speech recognition models to a speaker environment.

BACKGROUND OF THE INVENTION

Speech recognition systems that employ Hidden Markov Modeling (HMM) are well known in the art. HMM models are generally trained for some training database of speech, which fixes the parameters of the HMMs based on statistical information within the training data. During recognition, the HMM models do not change depending on the characteristics of the incoming speech. Thus, while the HMM models may be able to explain the typical expected environment, they may not be able to describe the encountered environment well.

Differences between the expected and the encountered environment may result from variabilities encountered in the speech signal. Such variabilities may be caused by any combination of background noise or interference, channel or handset noise, filtering characteristics, and even effects due to speaker differences such as dialect.

To compensate for the variabilities encountered in a speech signal, many speech recognition systems rely on a mixture of HMM models where each state of the model has a corresponding probability distribution defined by a mixture of a large number of distributions to count for the variabilities. These models have a large number of parameters and become unwieldy when attempting to use them in many practical real-time applications.

SUMMARY OF THE INVENTION

Accordingly, a need has arisen in the art for an improved speech recognition system. The present invention provides a method and system of adapting speech recognition models to a speaker environment.

In accordance with the present invention, speech may be recognized by receiving a spoken password using a set of speaker independent (SI) speech recognition models. A mapping sequence for the spoken password may then be determined between the input password and model states. A speaker ID may be identified by applying speaker dependent speech recognition models to the spoken password. A transform may be determined between the SI speech recognition models and the spoken password using the mapping sequence. Speaker adapted (SA) speech recognition models may be generated by applying the transform to SI speech recognition models. A speech input may then be recognized by applying the SA speech recognition models.

More specifically, in accordance with one embodiment of the present invention, the transform may be an affine transform for mean vectors of the SI speech recognition models. In this embodiment, the affine transformation matrix of the affine transform may be entirely estimated, constrained to be diagonal, or constrained to an identity matrix of the SI speech recognition models.

Technical advantages of the present invention include providing a speech recognition system that is adaptable to a speaker environment. In particular, a transform between the SI speech recognition models and the spoken password may be determined. The speech recognition system may apply the transform to the SI speech recognition models or to a speech input to better recognize the speech input during the communication session.

Other technical advantages of the present invention include providing a speech recognition system that uses a previously spoken phrase to adapt speech recognition models. In particular, a spoken password may be requested for identification and verification processing. The password may later be used to determine a transform to compensate for a user environment. Accordingly, no extra interaction between the system and the speaker is required.

Other technical advantages will be readily apparent to one skilled in the art from the following figures, descriptions, and claims.

BRIEF DESCRIPTION OF THE DRAWINGS

For a more complete understanding of the present invention and its advantages thereof, reference is now made to the following description, taken in conjunction with the accompanying drawings, wherein like reference numerals represent like parts, in which.

DETAILED DESCRIPTION OF THE INVENTION

Figure 1:
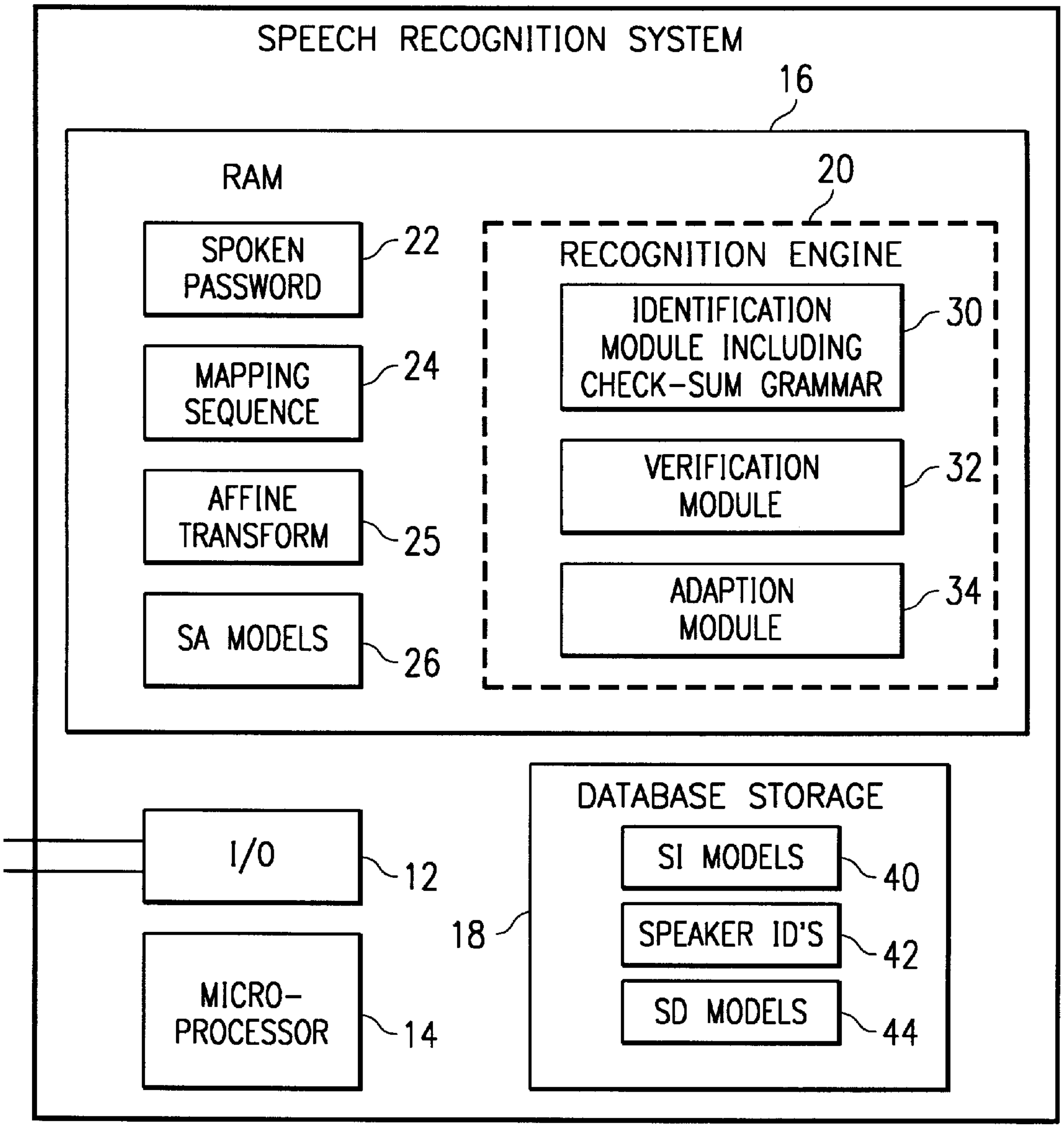
FIG. 1 illustrates a block diagram of a speech recognition system in accordance with one embodiment of the present invention.
Figure 2:
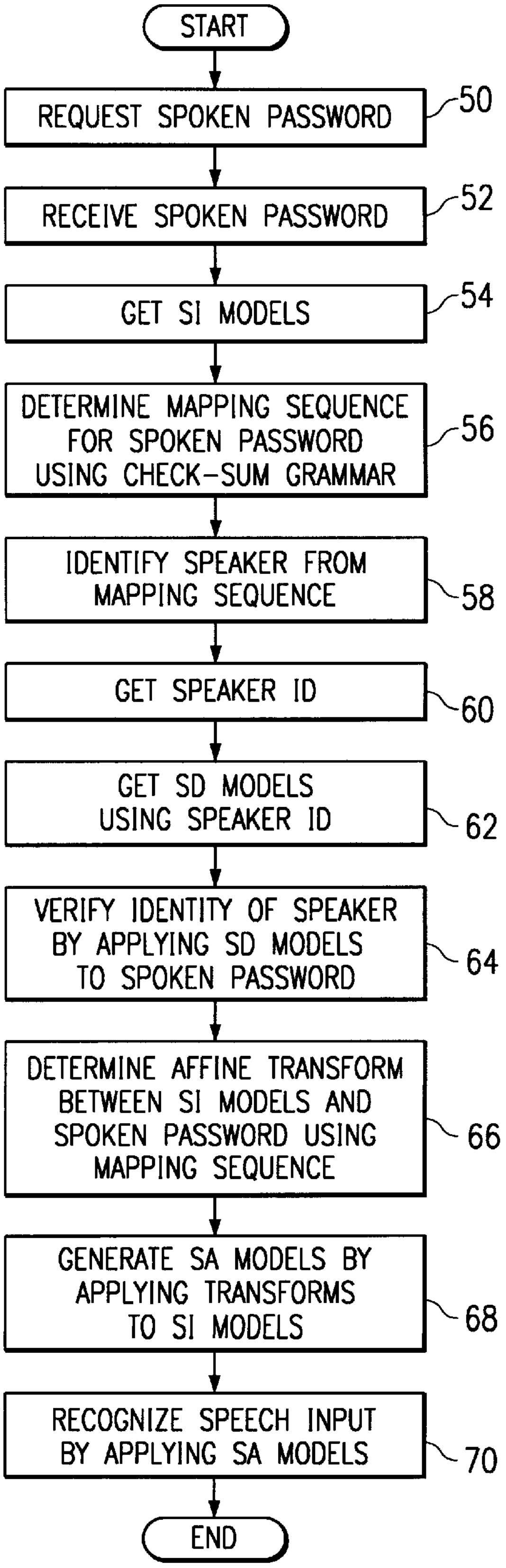
FIG. 2 illustrates a flow diagram of a method of adapting speech recognition models in accordance with the one embodiment of the present invention.

The preferred embodiments of the present invention and its advantages are best understood by referring now in more detail to FIGS. 1–2 of the drawings, in which like numerals refer to like parts. FIG. 1 illustrates a block diagram of a speech recognition system 10 in accordance with one embodiment of the present invention. As described in more detail below, the speech recognition system 10 may identify a speaker and verify the identity of the speaker. Using information obtained by these processes, the speech recognition system 10 may adapt speech recognition models to the speaker environment. Accordingly, the speech recognition system 10 may better recognize subsequent voice commands issued by the speaker.

The speech recognition system 10 may comprise an input/output system 12, a microprocessor 14, a random access memory (RAM) 16, and a database 18. The input/output system 12 may be connected to a telephony network (not shown) to provide access to secured services such as long distance dialing or secured information such as a database. In this embodiment, the speech recognition system 10 may receive and transmit over the network. It will be understood that the input/output system 12 may be connected to other networks or systems capable of transmitting and/or processing speech signals.

The present invention includes computer software that may be loaded into RAM 16 and executed by the microprocessor 14. The computer software may be loaded into RAM 16 from disk storage (not shown). Disk storage may include a variety of types of storage media such as, for example, floppy disk drives, hard disk drives, CD-ROM drives or magnetic tape drives.

RAM 16 may include a recognition engine 20, a spoken password 22, a mapping sequence 24 and speaker adapted (SA) speech recognition models 26. The recognition engine 20 may include an identification module 30, a verification module 32, and an adaption module 34. As described in more detail below, the identification module 30 may request the spoken password 22 to identify a speaker. In identifying the speaker, the identification module may map the spoken password 22 to speaker independent (SI) speech recognition models 40 of the system 10, resulting in a mapping sequence 24, which is determined by the identification module 30. The identification module 30 determines the identity of the speaker from the mapping sequence.

The verification module 32 may verify the identity of the user by retrieving the speaker ID and using the ID to get speaker dependent (SD) speech recognition models associated with the speaker. The verification module 32 may apply the SD speech recognition models to the spoken password 22 to verify the identity of the speaker. The adaptation module 34 may use the spoken password 22 and the mapping sequence 24 to determine a transform 25 for adapting the SI speech recognition models to the speaker environment. The adaption module 34 may then generate an SA speech recognition model 26 by applying the transform 25 to an SI speech recognition model 40. It will be understood that the modules 30, 32 and 34 may comprise computer software that may be otherwise combined or divided within the scope of the invention. Accordingly, labels identification, verification and adaption for the modules are for illustrated purposes and may be varied within the scope of the invention.

In accordance with the foregoing, the SA speech recognition models 36 are channel compensated to account for background noise or interference, channel or handset noise, filtering characteristics or other variabilities of the speech signal. Thus, the speech recognition system 10 is able to accurately recognize and respond to speech commands or instructions. The SA speech recognition models 26 may be used during the duration of the communication session in which the spoken password was received and thereafter be deleted.

The database storage 18 may include the SI speech recognition models 40 as well as a speaker ID database 42 and a SD speech recognition model database 44. The SI speech recognition models 40, SD speech recognition models 44, and SA speech recognition models 26 may comprise Hidden Markov Modeling (HMM) models. It will be understood that other modeling techniques may be used with the scope of the present invention. For example, dynamic time warping (DTW) techniques may be used within the scope of the present invention. It will be further understood that the software modules, speech recognition models, and information received or determined by the speech recognition system 10 may be otherwise stored within the scope of the present invention.

FIG. 2 illustrates a method of adapting speech recognition models to a speaker environment in accordance with one embodiment of the present invention. The method begins at step 50 wherein a spoken password is requested by the recognition engine 20. In one embodiment, the spoken password may be a numeric phrase such as a speaker's social security number. It will be understood that the spoken password may comprise other types of phrases within the scope of the present invention.

Proceeding to step 52, the spoken password may be received from a speaker. The spoken password 22 may be stored in RAM 16, where it may be utilized by the identification module 30, verification module 32, and adaption module 34. Next, at step 54, the identification module 30 may get a set of speaker-independent (SI) speech recognition models 40 from the database storage 18.

Steps 56–58 may be performed by the identification module 30 to identify the speaker. At step 56, a mapping sequence may be determined for the spoken password 22 and SI speech recognition models 40. In one embodiment, the identification module 30 may use a check-sum grammar along with the SI models 40 to determine the mapping sequence. Check-sum methods may provide high yield recognition performance for the spoken password 22. The mapping sequence 24 may be stored in RAM 16 for use by the identification module 30, verification module 32 and the adaption module 34. A high performance check-sum speech recognition method is disclosed in U.S. Pat. No. 5,222,187, entitled "Grammar-Based Check Sum Constraints for High Performance Speech Recognition Circuit," issued to Doddington, et al., Jun. 22, 1993, which is hereby incorporated by reference. It will be understood that other high yield recognition performance methods may be used to determine the mapping sequence within the scope of the present invention. For example, the spoken password 22 may be constrained to a known set chosen to provide highly reliable recognition performance. At step 58, the identification module 30 may identify the speaker from result of mapping the SI speech recognition models 40 to the spoken password.

Steps 60–64 may be performed by the verification module 32 to verify the identity of the speaker. At step 60, the verification module 32 may get speaker ID information from the speaker ID database 42. Next, at step 62, the verification module 32 may use the speaker ID to get SD speech recognition models associated with the identified user. The SD speech recognition models may be retrieved from the SD speech recognition model database 44. At step 64, the verification module 32 may verify the identity of the speaker by applying the SD speech recognition models 44 to the spoken password 22. The identity of the speaker may be verified where the spoken password 22 matches the SD speech recognition models 44 closely within conventional criteria. After the identity of the speaker has been verified, the speaker may be allowed access to services or information secured by the speech recognition system 10.

Steps 66–68 may be performed by the adaption module 34 to adapt the SI speech recognition models 40 to the user environment. At step 66, the adaption module 34 may determine a transform between the SI speech recognition models 40 and the spoken password 22 using the mapping sequence 24. As previously described, the mapping sequence 24 may have been determined during the user identification process. Accordingly, no new information need be attained from the speaker in order to carry out the adaption process.

In one embodiment, the transform may be affine transform of the SI speech recognition models 40. In this embodiment, the SI speech recognition models 40 may be HMM models having an associated Gaussian distribution means $\mu_s$. associated with states s of the HMM models. The SI speech recognition models 40 may be adjusted by a single affine transformation to obtain resulting mean vectors that better represent the speaker environment. Accordingly, an adaptive mean vector $\bar{\mu}_s$ of the SI speech recognition models 40 may be defined as follows:

$$\bar{\mu}_s = A \cdot \mu_s + b$$

where $\bar{\mu}_s$ is the adapted mean vector for HMM states;

$\mu_s$ is the SI mean vector for HMM state s;

A is the transformation matrix; and b is the bias vector.

To define the affine transform, the transformation matrix A and the bias vector b need to be determined. The matrix and vector may be defined by minimizing the error function:

$$E = \frac{1}{N}\sum_{i=1}^{N}(f_i - \mu_s(i))^T \cdot (f_i - \mu_s(i))$$

where N is the number of adapting speech feature vectors from the spoken password;

$f_i$ is the input speech feature vector for frame i;

T denotes vector transpose;

$\mu_{s(i)}$ is the Gaussian distribution mean vector from HMM states s(i);

s(i) is the HMM state mapped to input speech feature vector $f_i$ by the mapping sequence.

By determining the partial derivatives of the error function with respect to the transformation matrix A and the bias vector b, to minimize error function the solution is given by the following set of calculations:

$$\overline{f} = \frac{1}{N}\sum_{i=1}^{N} f_i$$

$$\overline{\mu} = \frac{1}{N}\sum_{i=1}^{N} \mu_{s(i)}$$

$$C_{\mu\mu} = \frac{1}{N}\sum_{i=1}^{N} \mu_{s(i)}\mu_{s(i)}^T - \overline{\mu}\,\overline{\mu}^T$$

$$C_{f\mu} = \frac{1}{N}\sum_{i=1}^{N} f_i\mu_{s(i)}^T - \overline{f}\,\overline{\mu}^T$$

$$A = C_{f\mu} \cdot C_{\mu\mu}^{-1}$$

$$b = \overline{f} - A \cdot \overline{\mu}$$

$C_{f\mu}$ is the cross-correlation value $C_{\mu\mu}$ is the auto-correlation value In one embodiment, the size of the transformation may be sixteen by sixteen (16×16). This matrix is relatively large and requires the estimation of 256 parameters, which can generally not be estimated well given only a single spoken password. Accordingly, reduced forms of the affine transform may be used within the scope of the present invention. In one embodiment, the affine transformation matrix A may be constrained to be diagonal. In this embodiment, the diagonal elements may be estimated and the remaining elements set to zero (0). Where the transformation matrix A is constrained to be diagonal, the cross and auto correlation equations may be replaced by:

$$C_{f\mu} = \frac{1}{N}\sum_{i=1}^{N} diag(f_i\mu_{s(i)}^T) - diag(\overline{f}\,\overline{\mu}^T)$$

$$C_{\mu\mu} = \frac{1}{N}\sum_{i=1}^{N} diag(\mu_{s(i)}\mu_{s(i)}^T) - diag(\overline{\mu}\,\overline{\mu}^T)$$

Accordingly, much less computation is necessary due to the reduced number of parameters. In another embodiment, processing may be further reduced by constraining the transformation matrix A to an identity matrix. In this embodiment, the diagonal elements of the matrix may be set to one (1) and the remaining elements set to zero (0). Accordingly, no estimations are required for the transformation matrix A and only the bias vector b need be determined.

Proceeding to step 68, a SA speech recognition model 26 may be generated by applying the transform to a SI speech recognition model 40. In one embodiment, all of the SI speech recognition models 40 may be transformed to SA speech recognition models 26 and stored in RAM 16 after the transform has been determined. In another embodiment, the SI speech recognition models 40 may only be transformed to SA speech recognition models 26 as needed by the recognition engine 20 in response to speech input.

Next, at step 70, the recognition engine 20 may recognize further speech inputs by applying the SA speech recognition models 26 to the speech input. It will be understood that the transform may be used to adapt the speech input to the SI speech recognition models 40 within the scope of the present invention. Step 70 leads to the end of the process.

The SA speech recognition models 26 provide significant improvement over the SI speech recognition models 40. Accordingly, the speaker need not lose valuable time reissuing commands or dealing with misinterpreted commands.

Although the present invention has been described with several embodiments, various changes and modifications may be suggested to one skilled in the art. It is intended that the present invention encompass such changes and modifications as fall within the scope of the appended claims.

What is claimed is:

1. A method of recognizing speech comprising the steps of:

receiving a spoken password utterance for access to a speaker environment;

getting a set of speaker independent(SI) speech recognition models;

determining a mapping sequence between the SI speech recognition models and speech input frames in the spoken password utterance that comprise recognition of the utterance;

determining a transform between the SI speech recognition models and the spoken password utterance using the mapping sequence;

generating speaker adapted (SA) speech recognition models by applying the transform to SI speech recognition models; and recognizing a nonpassword speech utterance in said speaker environment by applying the SA speech recognition models.

2. The method of claim 1, further comprising the steps of:

getting a speaker ID;

getting speaker dependent (SD) speech recognition models using the speaker ID; and verifying the identity of the speaker by applying the SD speech recognition models to the spoken password utterance.

3. The method of claim 1, wherein the spoken password utterance is a numeric phrase.

4. The method of claim 1, wherein the speech recognition models are Hidden Markov Modeling (HMM) models.

5. The method of claim 1, wherein the mapping sequence is determined by using a check-sum grammar comprising the steps of:

converting the spoken password utterance into a set of speech feature vectors; and determining the mapping sequence by minimizing the difference between the speech feature vectors and the SI speech recognition models, while enforcing the check-sum grammar constraints.

6. The method of claim 1, further comprising the step of generating a SA speech recognition model for each SI speech recognition model.

7. The method of claim 1, wherein the SA speech recognition model is generated when needed to recognize the speech input.

8. The method of claim 1, wherein the step of determining a transform between the SI speech recognition models and the spoken password utterance comprises the step of determining an affine transform for mean vectors of the SI speech recognition models.

9. The method of claim 8, further comprising the step of constraining an affine transformation matrix of the affine transform to be diagonal.

10. The method of claim 8, further comprising the step of constraining an affine transformation matrix of the affine transform to an identity matrix.

11. A method of recognizing speech, comprising the steps of:

receiving a spoken password utterance for access to a speaker environment;

getting a set of speaker independent (SI) speech recognition models;

determining a mapping sequence between the SI speech recognition models and speech input frames for the spoken password utterance identifying a speaker ID from the mapping sequence between the SI speech recognition models and the spoken password utterance;

determining a transform between the SI speech recognition models and the spoken password utterance using the mapping sequence;

generating speaker adapted (SA) speech recognition models by applying the transform to SI speech recognition models; and recognizing a nonpassword speech utterance in said speaker environment by applying the SA speech recognition models to the nonpassword speech utterance.

12. The method of claim 11, further comprising the steps of:

getting a speaker ID;

getting speaker dependent (SD) speaker recognition models using the speaker ID; and verifying an identity of the speaker by applying the SD speaker recognition models to the spoken password utterance.

13. The method of claim 11, wherein the spoken password utterance is a numeric phrase.

14. The method of claim 11, wherein the speech recognition models are Hidden Markov Modeling (HMM) models.

15. The method of claim 11, wherein the mapping sequence is determined by using a check-sum grammar, comprising the steps of:

converting the spoken password utterance into a set of speech feature vectors; and determining a mapping sequence by minimizing the difference between the speech feature vectors and the SI speech recognition models, while enforcing the check-sum grammar constraints.

16. The method of claim 11, wherein the step of determining a transform between the SI speech recognition models and the spoken password utterance comprises the step of determining and affine transform for the spoken password utterance.

17. The method of claim 16, further comprising the step of confining an affine transformation matrix of the affine transform to be diagonal.

18. The method of claim 16, further comprising the step of confining an affine transformation matrix of the affine transform to be an identity matrix of the SI speech recognition models.

19. A speech recognition system, comprising:

a recognition engine having an identification module and an adaption module;

a database having a set of speaker independent (SI) speech recognition models;

the identification module operable to receive a spoken password utterance, determine a mapping sequence of the spoken password utterance in a speaker environment to SI speech recognition models, and identify the speaker from the mapping sequence;

the adaption module operable to determine a transform between the SI speech recognition models and the spoken password utterance using the mapping sequence and to generate a speaker adapted (SA) speech recognition model by applying the transform to SI speech recognition models; and the recognition engine operable to recognize a nonpassword speech utterance in said speaker environment by applying the SA speech recognition model.

20. The speech recognition system of claim 19, further comprising:

the recognition engine including a verification module; and the verification module operable to get a speaker ID, get SD speaker recognition models using the speaker ID, and verify an identity of the speaker by applying the SD speech recognition models to the spoken password utterance.

21. A speech recognition system, comprising:

a recognition engine having an identification module and an adaption module;

a database having a set of speaker independent (SI) speech recognition models;

the identification module operable to receive a spoken password utterance determine a mapping sequence of the spoken password utterance in a speaker environment to SI speech recognition models, and identify the speaker from the mapping sequence;

the adaption module operable to determine a transform between the SI speech recognition models and the spoken password utterance using the mapping sequence and to generate a speaker adapted (SA) speech recognition model by applying the transform to SI speech recognition models; and the recognition engine operable to recognize a nonpassword speech utterance in said speaker environment by applying the SA speech recognition model to the nonpassword speech utterance.

22. The speech recognition system of claim 21, further comprising:

the recognition engine including a verification module; and the verification module operable to get a speaker ID, get speaker dependent (SD) speaker recognition models using the speaker ID, and verify an identity of the speaker by applying the SD speech recognition models to the spoken password utterance.

23. A method of recognizing speech comprising the steps of:

receiving a spoken keyword utterance in a speaker environment;

getting a set of speaker independent (SI) speech recognition models;

determining a mapping sequence between the SI speech recognition models and the speech input frames in the spoken keyword utterance;

determining a transform between the SI speech recognition models and the spoken keyword utterance using the mapping sequence;

generating speaker adapted (SA) speech recognition models by applying the transform to SI speech recognition models; and recognizing a nonkeyword speech utterance in said speaker environment by applying the SA speech recognition models.

* * * * *